United States Patent [19]

Barr

[11] Patent Number: 5,587,968
[45] Date of Patent: Dec. 24, 1996

[54] METHOD FOR MEASURING THE NEAR-SURFACE SHEAR WAVE VELOCITY FOR USE IN DETERMINING 3-COMPONENT 3-D STATICS

[75] Inventor: Frederick J. Barr, Houston, Tex.

[73] Assignee: Western Atlas International, Inc., Houston, Tex.

[21] Appl. No.: 519,463

[22] Filed: Aug. 25, 1995

[51] Int. Cl.$^6$ ............................................. G01V 1/36
[52] U.S. Cl. ........................................ 367/75; 367/54
[58] Field of Search ............................ 367/36, 37, 38, 367/50, 54, 75; 364/421

[56] References Cited

U.S. PATENT DOCUMENTS

| | | | |
|---|---|---|---|
| H1,529 | 5/1996 | Schneider, Jr. et al. | 367/54 |
| 2,087,120 | 7/1937 | Salvatori et al. | 367/53 |
| 4,577,298 | 3/1986 | Hinkley | 367/50 |
| 4,695,984 | 9/1987 | Paal | 367/54 |
| 4,817,061 | 3/1989 | Alford et al. | 367/75 |

OTHER PUBLICATIONS

Rothman, Daniel H. "Nonlinear inversion, statistical mechanics, and residual statics estimation" Geophysics, vol. 50, No. 12 (Dec. 1985); pp. 2784–2796, 8 figs.

Wiggins, Ralph A., Larner, Kenneth L.; and Wisecup, Robert D., "Residual Statics Analysis as a General Linear Inverse Problem", Geophysics, vol. 41, No. 5 (Oct. 1976), pp. 922–938, 15 figs., 2 tables.

*Primary Examiner*—Ian J. Lobo
*Attorney, Agent, or Firm*—William A. Knox

[57] ABSTRACT

In the presence of an anisotropic near-surface earth layer, orthogonally oriented microspreads are provided from which shear-wave velocity vectors $V_{si\theta}$ and $V_{s\theta}$ may be determined. The respective velocities are calculated from measurements of the direct path first arrivals and of the velocity of the boundary waves propagating along the upper boundary of the near surface layer. The ratio of the near-surface shear-wave velocity vectors is used to scale the static time corrections attributable to seismic data received by shear wave sensors whose axes of responsivity coincide with the orientation of the microspreads.

6 Claims, 2 Drawing Sheets

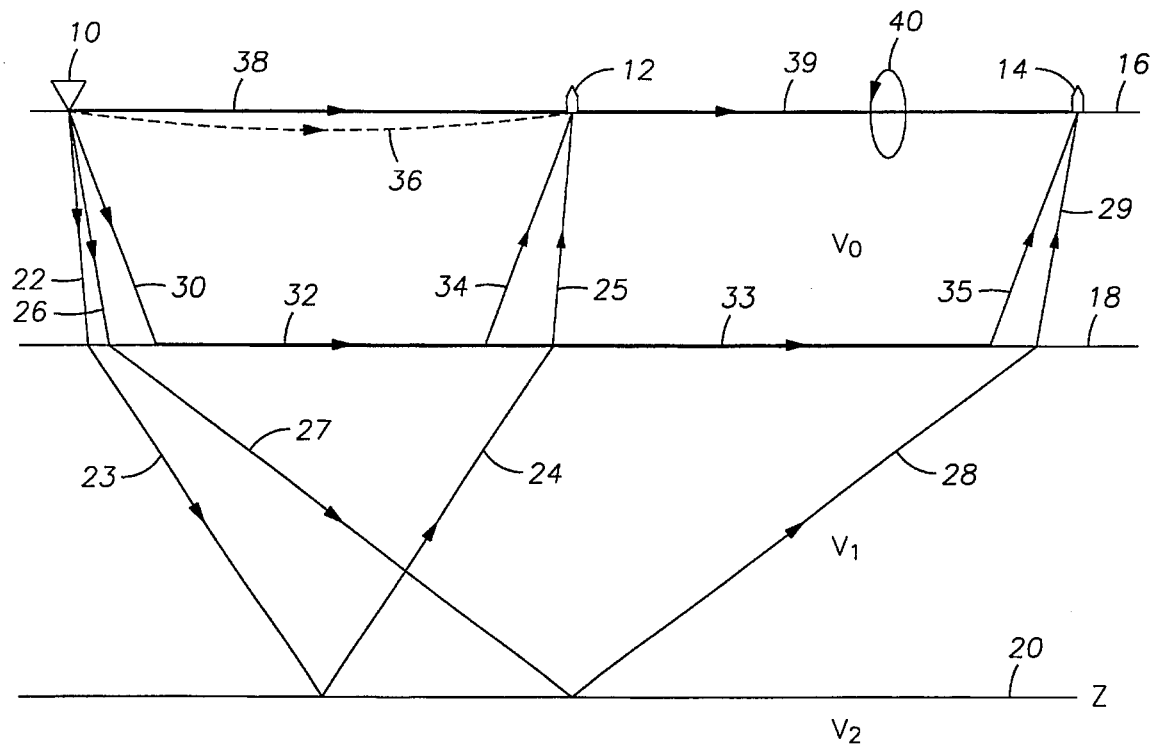
FIG. 1
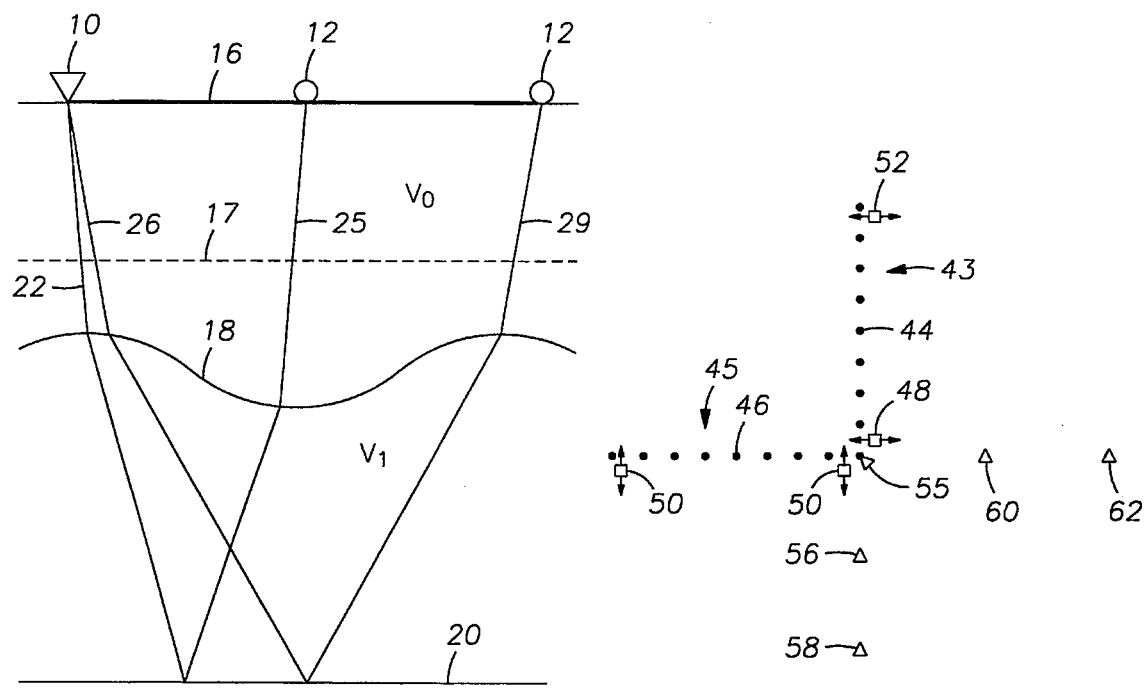
FIG. 2
FIG. 3

METHOD FOR MEASURING THE NEAR-SURFACE SHEAR WAVE VELOCITY FOR USE IN DETERMINING 3-COMPONENT 3-D STATICS

BACKGROUND OF THE INVENTION

1. Field of the Invention

A method for the determination of the static corrections to be applied to shear-wave reflection data in the presence of shear-wave anisotropy in the near-surface earth material.

2. Discussion of Related Art

Seismic exploration is a method for acoustically measuring and displaying the topography of one or more subsurface earth layers of interest along a selected line of survey. Typically a sound source creates an acoustic wavefield at or near the surface of the earth. Certain of the wavefield components propagate downwardly into the earth whence they are reflected back to the surface from various subsurface earth layers. Other components are refracted along the various interfaces between earth layers. Yet other wavefield components propagate directly along the surface of the earth or just beneath the surface. The returning direct, reflected and refracted acoustic signals are sensed by each of a plurality of suitable spaced-apart seismic sensors emplaced at or near the surface of the earth along the line of survey at selected stations. The sensors convert the acoustic signals to electrical signals that may be transmitted to a storage/computer means for later processing and display. The processed seismic data harvested along each line of survey are presented as a display of a plurality of time-scale traces laterally spaced apart in accordance with the sensor spacing. From a plurality of intersecting lines of survey, a detailed multi-dimensional topographic map of one or more targeted subsurface formations can be displayed.

A seismic source for land use may be a small explosive or impactive device triggered at or near the surface of the earth or the source may be a vibrator. Explosive or impactive devices radiate an essentially non-polarized, omni-directional wavefield including troublesome boundary or Rayleigh waves. A vibrator injects a chirp signal into the ground. The vibrator can be designed to produce compressional (P) waves, horizontally polarized shear (SH) waves or vertically polarized (SV) shear waves.

P waves vibrate in-line with the direction of propagation. SH waves vibrate transversely and horizontally with respect to the propagation direction. SV waves, as the name implies, vibrate vertically with respect to the direction of propagation. Rayleigh waves propagate along the air-earth interface as boundary waves having an elliptical retrograde mode in the presence of an earth layer whose velocity increases with depth.

In seismic surveying, the desired wave types are usually P-waves and S-waves. The frequency content may be on the order of 10 to 100 Hz. Rayleigh waves, on the other hand are very low-frequency, one to 30 Hertz or less, high-amplitude events which seriously mask the early-arriving reflected events. Geophysicists traditionally go to great lengths to eliminate or at least minimize the generation of Rayleigh waves, also known as ground roll, which are considered to be useless trash signals. Methods used to eradicate Rayleigh waves include carefully-designed spatial and instrumental filtering regimes during data acquisition and sophisticated data-processing techniques during the data interpretation phase.

In terms of velocities, P waves most commonly range from about 1450 meters per second (m/s) for water to as much as 5000 m/s for competent formation layers although extreme values of 8 km/s have been encountered for deep crustal layers. In the weathered layer near the surface, P-waves may have a velocity as low as 500 m/s. Shear waves have a velocity of about half the corresponding P wave velocity. Shear waves can not propagate in fluids. The velocity of Rayleigh waves may be about 0.8 to 0.9 that of the corresponding shear-waves but can never equal or exceed the shear wave velocity.

Throughout this disclosure, the term "velocity" means the velocity of propagation of an acoustic wave through a medium under consideration. If that term is used in any other sense, it will be so defined.

Some rock types are isotropic, exhibiting the same velocity in all directions. Other rock types, those that are well stratified or that are characterized by distinct fracture planes, are anisotropic such that their velocity is azimuth dependent.

A shear-wave seismic survey is particularly useful in the diagnosis of vertical fracture plane orientation by analyzing the anisotropic effect due to formation fracture planes, a matter that is important in establishing the azimuthal alignment of a deviated borehole for use in oil and gas recovery. See for example U.S. Pat. No. 4,817,061, issued Mar. 28, 1989 to R. M. Alford et al. wherein a shear-wave-survey method is disclosed which, in one embodiment, may be carried out by using differently polarized shear waves along a common line of profile. Two different sets of data are collected, one set for each polarization direction. A first data set is provided by imparting shear wave energy into the earth by a shear wave seismic source polarized in a first direction along a seismic line of profile, to be received by a first sensor having matched polarization. A second data set is provided by imparting shear wave energy into the earth by a shear wave seismic source polarized in a second direction along the seismic line of survey and received by a second sensor having matched polarization. A first and a second sensor may be co-located at each station. A conventional P-wave reflection survey may accompany the shear-wave survey. The survey results derived from the respective sets of data are processed, separately displayed and compared; any differences between the displays constitute a measure of fracture orientation and density. According to Alford, subsurface zones of high fracture density, once identified have been found to afford a higher likelihood of successful oil well completion.

In addition to oil exploration, shear-wave analyses of the velocity of the near surface material are useful in engineering studies to determine the load-bearing distribution characteristics of the soil using Poisson's ratio, $\sigma$, which is given by $$\sigma=(R^2-2)/2(R^2-1), \tag{1}$$

where $R=V_p/V_s$, $V_p$ is the P-wave velocity and $V_s$ is the shear wave velocity of the near surface material. Assuming that the earth consists of alternating thin layers of elastic material between layers of an inelastic material, the vertical stress, q, at some depth, z, at a radial distance, r, from the point of application of a concentrated load, Q, may be estimated from $$q = \frac{Q\left(\frac{a}{b}\right)^{1/2}}{2\pi z^2 \left[\frac{a}{b} + \left(\frac{r}{z}\right)^2\right]^{3/2}}, \qquad (2)$$

where $a = (1-2\sigma)$, and $b = (2-2\sigma)$.

Reflection data of all types, whether P-wave or S-wave, must be corrected for the irregular time delays (also known as statics or static corrections) through the near-surface weathered layer as will now be explained.

Please refer to FIG. 1. A surface source 10 radiates a wavefield into the earth which propagates to sensors 12 and 14 emplaced on the surface 16 (air-earth interface) of the earth. One source and two sensors are shown but several sources may be used in tandem and several hundred spaced-apart sensors may be deployed along a line of survey in the real world. In a stratified earth, layer $V_0$ sandwiched between interfaces 16 and 18 is the low velocity, weathered layer or LVL. Layer $V_1$ might have a P-wave velocity of 2150 m/s while the layer beneath interface 18 at some depth Z might indicate a P-wave velocity of about 3000 m/s. The respective shear wave velocities would be about half the above values.

In FIG. 1, ray segments 22, 23, 24, 25 represent the trajectory of a wave field from source 10 to sensor 12 after reflection from interface 20. Ray segments 26–29 show the wavefield trajectory from source 10 to sensor 14. Refracted energy propagates along segments 30,32 and 34 to sensor 12 and along segments 30, 32, 33 and 35 to sensor 14. For distances less than the critical distance, the seismic signals arriving first will travel via a direct path 36 to a sensor such as 12. Beyond the critical distance, the refracted arrivals from the base of the LVL will appear first because of their shorter travel time due to refraction along interface 18. Rayleigh or boundary waves travel along segments 38 and 39 to sensors 12 and 14 respectively at the air-earth interface 16 in an elliptical retrograde mode as shown by ellipse 40.

Energy traveling to sensor 12 after reflection from interface 20 is retarded by passage through the LVL over segments 22 and 25 at velocity $V_0$. Similarly for energy traveling to sensor 14 via segments 26 and 29. If the LVL thickness is uniform and $V_0$ does not change laterally, the time delay will be the same at both sensors. If, on the other hand, there is a thickness difference as in FIG. 2, after correction for angularity (NMO) the travel times for a reflection from a flat interface as seen by two spaced-apart sensors such as 12 and 14, will show a false time differential due to a greater thickness of LVL beneath sensor 12. As earlier stated, the required compensatory time corrections are known as static corrections or simply statics.

A classical method for evaluating static corrections is taught by U.S. Pat. No. 2,087,120 issued Jul. 13, 1937 to H. Salvatori et al. In that method, the distance between the source and a sensor such as 12 is divided by the formation velocity, $V_1$, to yield the travel time over refracted travel path 32 to sensor 12 along interface 18. That time is subtracted from the total observed refracted travel time. The remainder is the total static delay time At through the LVL. The slight error due to use of an assumed vertical path vs. the actual slant paths such as 22 and 25 is usually not significant for the velocity relationships ordinarily encountered. Statics for sensor 14 are calculated similarly. The statics applicable to each sensor are subtracted from the total reflection travel time seen by that sensor. The reflection travel time, corrected for NMO and statics, is then extrapolated to an arbitrary reference surface, using some preselected replacement velocity $V_r$ to account for elevation differences.

U.S. Pat. No. 4,577,298, issued Mar. 18, 1986 to David Hinkley, teaches a more sophisticated method for applying surface consistent statics to seismic traces. Measurements based on the time of arrival of reflection and refraction signal components in a trace gather are used to produce source-receiver statics estimates which are used in turn to correctly time-shift the individual traces of the gather for subsequent common depth point stacking.

In another commercial method, the residual statics are determined by cross correlation between the seismic traces as described by Ralph Wiggins in *Residual Static Correction Analysis as a General Linear Inverse Problem*, published in Geophysics, v. 41, n. 5, 1976.

D. H. Rothman, in *Non-linear Inversion, Statistical Mechanics and Residual Statics Estimation*, published in Geophysics, v. 50, n. 12, 1985, describes a Monte Carlo statistical method for obtaining static corrections.

It is of interest that all of those prior art methods apply to P-wave reflection profiling.

As is well known, velocity $V_0$ is usually either estimated or is measured with the aid of special weathering shots. The velocity so determined is a P-wave velocity. During data processing, an arbitrary, substantially constant value is selected for $V_0$ which is used to calculate statics at the respective sensor and source locations within a given region but without regard to the azimuth of the line of survey or to whether P-wave or S-wave data are to be processed because the LVL was, for simplicity, considered to be amorphous and isotropic.

I have discovered that the LVL is anisotropic. To prevent data misties between co-located shear wave sensors having mutually perpendicular polarizations, the static corrections must be determined using an LVL shear-wave velocity vector appropriate to the polarization directions of the individual sensors. Because the shear wave velocity attributable solely to the LVL cannot be straightforwardly measured directly, there is a need for a method for deriving that quantity indirectly.

SUMMARY OF THE INVENTION

In accordance with this invention there is proposed a method for providing static corrections for processing shear wave reflection data received by at least two sets of two, co-located shear wave sensors having first and second mutually perpendicular directions of polarization. A first microspread of spaced-apart seismic sensors is deployed along a first selected azimuth aligned with the first polarization direction. An acoustic source radiates a multimodal wavefield to sonically illuminate the sensors. The velocity of each of a plurality of selected near-surface wavefield propagation modes is derived from arrival-time differences of the respective multimodal wavefronts as a function of the spacing of the corresponding sensors. The so-derived velocities are resolved to provide a near-surface shear wave velocity vector directed along the first azimuth. A second microspread is deployed along a second selected azimuth in alignment with the second polarization direction and the steps of illuminating, deriving and resolving are repeated to provide a second near-surface shear wave velocity vector directed along the second azimuth. A scaling coefficient is formed from the ratio of the first shear wave velocity vector with respect to the second shear wave velocity vector. Static corrections attributable to reflection data received by the sensor having the second polarization direction are scaled by the scaling coefficient.

In an aspect of this invention, a first selected wavefield propagation mode includes compressional waves propagating directly through the low velocity layer from the source to the sensors. A second selected wavefield propagation mode includes boundary waves propagating along the upper boundary of the low velocity layer.

In a further aspect of this invention, the selected wavefield propagation modes are resolved using the formulation $$(2-c^2/V_{s\theta}^2)^2 - 4(1-c^2/V_0^2)^{1/2}(1-c^2/V_0^2)^{1/2} = 0$$

where c=group velocity of boundary wave, $V_0$=phase velocity of direct compressional wave, $V_{s\theta}$=low-velocity layer shear wave vector.

In an important feature of this invention, the source preferably is an unpolarized acoustic surface source that favors the generation of Rayleigh waves.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 1 is a review of the geometries involved in multimodal wavefield propagation in reflection and refraction processes;

FIG. 2 shows the relative effect of an irregular weathered layer/on LVL statics;

FIG. 3 shows a field arrangement for two intersecting microspreads;

DETAILED DESCRIPTION OF THE PREFERRED EMBODIMENT

Figure 4:
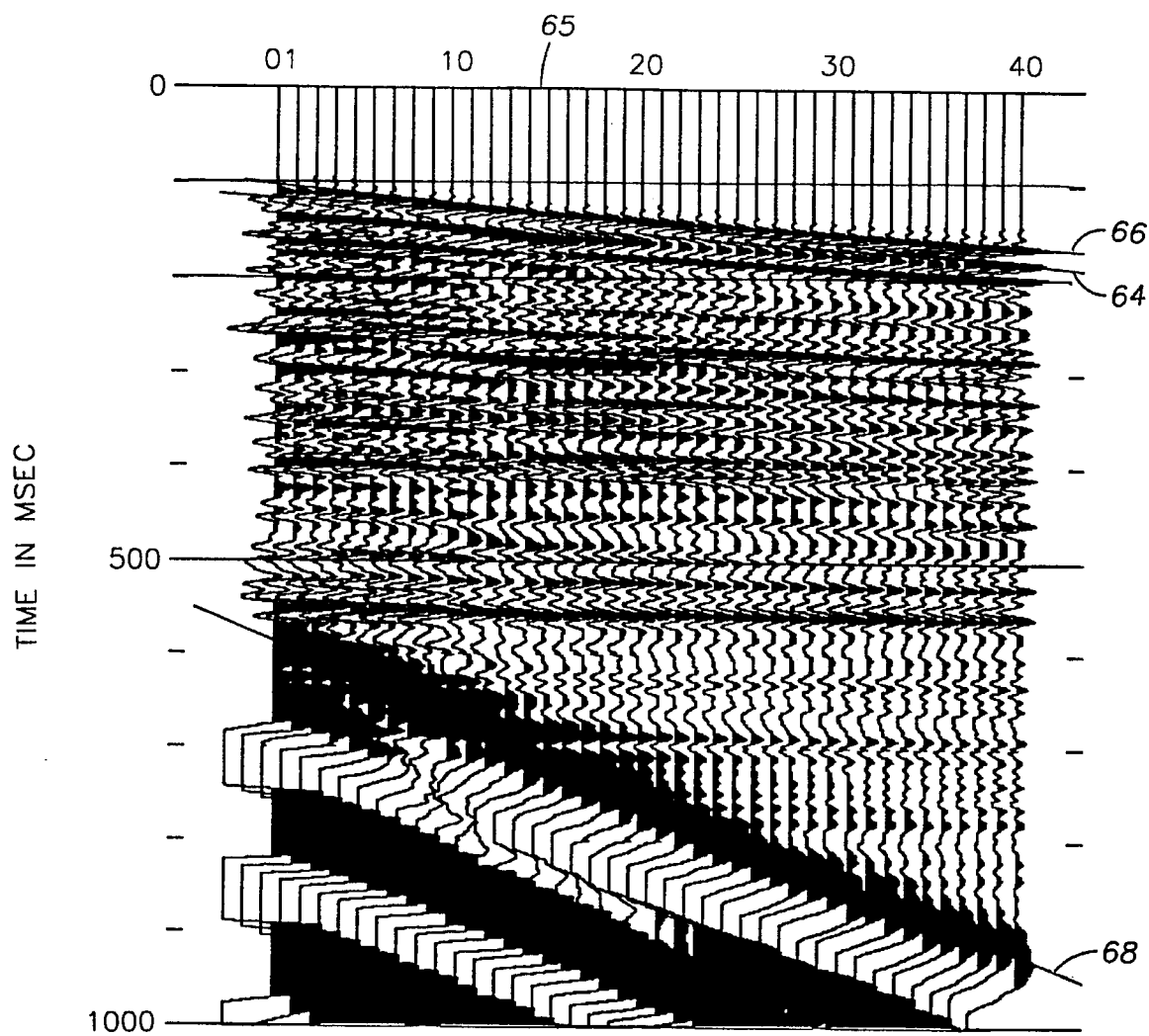
FIG. 4 is a field example of a seismic record section from a microspread used for measuring selected wavefield velocities.

Statics for use with shear wave reflection profiling are derived by using shear-wave velocity vectors $V_{s\theta}$ and $V_{si\theta}$ where $\Theta$ is the azimuthal direction of polarization of a first shear-wave seismic sensor and $i=\sqrt{-1}$. Although it is not usually possible to measure the shear wave velocity vectors directly, it is possible to determine an LVL shear wave velocity vector, $V_s$, along some preselected azimuth, $\Theta$, by resolving the phase velocity of the direct P-wave trajectory through the LVL with the group velocity c, of Rayleigh-waves propagating along the upper boundary of the LVL. I thus put to use the ground roll signals that were hitherto rejected by others as nuisance signals. The method is derived as follows:

From the literature, it is known that $$\frac{\partial^2 \psi}{\partial x^2} + \frac{\partial^2 \psi}{\partial y^2} + \frac{\partial^2 \psi}{\partial z^2} - \frac{1}{V^2}\frac{\partial^2 \psi}{\partial t^2} = 0. \quad (3)$$

Following a considerable amount of algebraic manipulation, it can be shown that for the model depicted in FIG. 1, and imposing the boundary conditions on a stress-free surface of vanishing stresses normal and parallel to the surface, (3) reduces to $$\left(2-\frac{c^2}{V_{s\theta}^2}\right)^2 - 4\left(1-\frac{c^2}{V_0^2}\right)^{1/2}\left(1-\frac{c^2}{V_{s\theta}^2}\right)^{1/2} = 0,$$

where c=velocity of Rayleigh wave propagating along top of LVL, $V_0$ =velocity of P-wave direct arrival through the LVL, $V_{s\theta}$=velocity vector of LVL shear wave.

Formulation (4) may be solved for $V_{s\theta}$ from the observed values for c and for $V_{s\theta}$ by starting with an estimated trial value for $V_{s\theta}$, using a root-finding iterative numerical solution by bracketing the interval (a,b) where the functions f(a) and f(b) change sign across the interval, given the restraint that $c < V_{s\theta}$.

FIG. 3 is a diagram of the layout of two short microspreads collectively shown as 43 and 45. Walk-away microspread operations are customarily used for detailed study of wavefield propagation modes. The small circles such as 44 and 46 represent vertically responsive, compressional wave sensors. For purposes of this application, the sensors are preferably placed 2.5 meters apart. It is particularly important that a high sensor density be provided between the source and the critical point where the refracted arrivals overtake the direct arrivals so that the LVL velocity may be accurately measured. The microspreads are aligned parallel to the orientations $\Theta$ and $i\Theta$ of the respective sensitive axes of the horizontally responsive shear-wave sensors 48, 50 and 52, 54. Preferably the in-line microspread extends between at least two sensor stations, each station including two shear wave sensors having mutually perpendicular polarizations, that comprise a portion of the line of survey.

The small triangles such as 55, 56, 58, 60 and 62 represent source locations. In a walk-away operation, a microspread sensor array such as 43 or 45 remains fixed while a source is triggered to produce an acoustic pulse whereupon the source is moved away from the array by successive intervals equal to a multiple of the array length. By that method an equivalent array of sensors of a desired length may be produced.

At each source location, an acoustic device, which may be a small explosive charge or a shot gun shell or an impactive device such as sledge hammer is triggered. Preferably the source is emplaced at or near the surface of the earth thereby to acoustically irradiate a microspread by a multimodal wavefield with specific consideration being given to conditions favoring the creation of ground roll.

In FIG. 3, two sets of two sensors are shown but many tens or hundreds of sensor sets or stations may be included in the line of survey in practice. Microspreads may be emplaced between a few selected sensor stations or between all sensor stations depending upon the problems to be solved.

FIG. 4 is a field example of a wavefield display recorded from a microspread 97.5 meters long, having 40 sensors spaced 2.5 meters apart. Separation between traces is therefore 2.5 meters horizontally. The record section is divided vertically into 100 millisecond time intervals.

Three prominent events are visible marked by straight lines 64, 66 and 68. Event 64 is due to the direct arrival through the LVL. The indicated phase velocity can be derived by inspection of the slope of line 64 which is $V_0$=1433.8 m/s.

At station 14, indicated by arrow 65, the slope of the first arriving events changes abruptly as shown by line 66. The slope of that line indicates a velocity of 2119 m/s and probably is due to arrivals refracted into the competent formation at the base of the LVL. Arrow 65 marks the critical point.

The low-frequency ground roll wavefield mode is represented by line 68. The group velocity, c, of this event can be determined by inspection of the slope of line 68 which is 292.8 m/s.

The shear-wave velocity vector $V_{s\theta}$ of the LVL may be calculated from a microspread oriented parallel to the polarization direction, $\Theta$, of the corresponding shear wave sensor such as shown by microspread 45 in combination with sensor 48. The quantities $V_0=1433.8$ m/s and $c=292.8$ m/s are substituted into (4) which is iteratively solved by numerical substitution.

Table 1 shows the progression for iterations N=3.

TABLE 1

| N = 1 | | N = 2 | | N = 3 | |
|---|---|---|---|---|---|
| $V_{s\theta}$ | Residue | $V_{s\theta}$ | Residue | $V_{s\theta}$ | Residue |
| 300 | 0.244372 | 300 | 0.244372 | 307.0 | 0.011788 |
| 310 | −0.05875 | 301 | 0.202615 | 307.1 | 0.009229 |
| 320 | −0.22776 | 302 | 0.164457 | 307.2 | 0.006685 |
| 330 | −0.33635 | 303 | 0.129332 | 307.3 | 0.004157 |
| 340 | −0.40687 | 304 | 0.096808 | 307.4 | 0.001645 |
| 350 | −0.45487 | 305 | 0.066549 | 307.5 | −0.00085 |
| 360 | −0.48660 | 306 | 0.038282 | 307.6 | −0.00334 |
| 370 | −0.50669 | 307 | 0.011788 | 307.7 | −0.00580 |
| 380 | −0.51825 | 308 | −0.013120 | 307.8 | −0.00826 |
| 390 | −0.52349 | 309 | −0.036590 | 307.9 | −0.01069 |
| 400 | −0.52398 | 310 | −0.058750 | 308.0 | −0.01312 |

A trial solution of $V_{s\theta}=300$ m/s is selected initially, iterating every 10 m/s until (4) converges to 0 and reverses sign at 310 m/s. The process is repeated, incrementing $V_{s\theta}$ in 1 m/s steps, bracketed around the interval between f(a)=300 m/s and f(b)=310 m/s, indicating a sign change between 307 and 308 m/s. The 307–308 m/s interval is further examined using 0.1 m/s steps to reveal convergence at $V_{s\theta}=307.5$ m/s. Further iterations using finer intervals are not be considered productive for practical application. Preferably, the iterative process is performed by a properly programmed computer having a programmable arithmetic logic unit.

The steps recited above are repeated for a microspread aligned along azimuth $i\Theta$ to provide an LVL shear wave velocity vector $V_{si\theta}$ that is orthogonal to $V_{s\theta}$. For purposes of this example, assume that a value of $V_{si\theta}=315$ m/s is obtained.

The separate velocity vectors may be used to compensate for LVL anisotropicity in calculating statics for a shear wave reflection survey as will be next be discussed.

Static correction times are determined for the shear wave sensors at each station along the line of survey, using any preferred method such as the method of Salvatori or the method of Hinkley. From the microspreads aligned with the azimuths $\Theta$ and $i\Theta$ corresponding to the axes of responsivity of the shear wave sensors at each station, determine the LVL shear wave velocity vectors $V_{s\theta}$ and $V_{si\theta}$.

Form a quadrature scaling coefficient, K, from the ratio $$K=V_{s\theta}/V_{si\theta}.$$

For the field example given above, K=307.5/315=0.976. The static correction times attributable to sensors having crossline axes of responsivity $i\Theta$ are equal to those for $\theta$ scaled by quadrature scaling coefficient K.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A method for scaling static time corrections for application to shear wave reflection data received by at least two sets of two co-located shear wave sensors having first and second mutually perpendicular polarization directions respectively, the sets being distributed in spaced-apart relationship along a line of survey, comprising:

a) acoustically irradiating a first microspread including a plurality of spaced-apart seismic sensors, the microspread being aligned along a first azimuth aligned with said first polarization direction;

b) determining the phase velocity of a compressional wave, propagating directly through a near-surface earth layer, from measurement of the arrival times of the compressional wave detected by each said sensor as a function of sensor spacing;

c) determining the group velocity of a boundary wave, propagating along the upper boundary of said near-surface earth layer, from the arrival time of the boundary wave detected by each said sensor as a function of sensor spacing;

d) resolving the so-determined velocities to define a first near-surface shear-wave velocity vector directed along said first azimuth;

e) repeating steps a) through d) for a microspread oriented along a second azimuth aligned with said second polarization direction, to define a second near-surface shear-wave velocity vector directed along said second azimuth;

f) defining a scaling coefficient from the ratio between said first and second near-surface shear wave velocity vectors;

g) applying said scaling coefficient to static time corrections applicable to seismic recordings received by shear-wave sensors whose polarization directions are aligned with said second azimuth.

2. The method as defined by claim 1, wherein:

the microspread sensors are responsive to vertical compressional waves.

3. The method as defined by claim 1, wherein:

said first and second microspreads are acoustically irradiated by an unpolarized, multimodal acoustic wavefield from a surface sound source that favors formation of a boundary wavefield mode of the Rayleigh type.

4. The method as defined by claim 3 comprising:

the compressional-wave velocity and the boundary wave velocity are resolved to determine a shear wave velocity vector from $$(2-c^2/V_{s\theta}^2)^2-4(1-c^2/V_0^2)^{1/2}(1-c^2/V_{s\theta}^2)^{1/2}=0,$$

where c=group velocity of the boundary wave,
   $V_0$=phase velocity of the directly-arriving wave,
   $V_{s\theta}$=low velocity layer shear wave velocity vector.

5. The method as defined by claim 4, wherein:

the orientation of the polarization direction of a first shear wave sensor is $\Theta$ and the orientation of the polarization direction of a second shear wave sensor is $i\Theta$;

forming a quadrature scaling coefficient from the ratio of the first near-surface shear-wave velocity vector with respect to the second near-surface shear-wave velocity vector;

applying said quadrature coefficient to static time corrections attributable to seismic reflection signals received by said second shear wave sensor.

6. The method as defined by claim 5, wherein:
said microspreads are placed between said first and second sets of sensors.

* * * * *